(12) United States Patent
Van Boxtel

(10) Patent No.: US 9,132,500 B2
(45) Date of Patent: Sep. 15, 2015

(54) METHODS AND SYSTEMS FOR FEEDING FILLER MATERIAL TO A WELDING OPERATION

(75) Inventor: Lee Thomas Van Boxtel, Little Chute, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 510 days.

(21) Appl. No.: 13/545,898

(22) Filed: Jul. 10, 2012

(65) Prior Publication Data

US 2014/0014627 A1 Jan. 16, 2014

(51) Int. Cl.
 B23K 9/133 (2006.01)
 B23K 9/167 (2006.01)

(52) U.S. Cl.
 CPC .............. *B23K 9/133* (2013.01); *B23K 9/1336* (2013.01); *B23K 9/167* (2013.01)

(58) Field of Classification Search
 CPC ....... B23K 9/133; B23K 9/1336; B23K 9/167
 See application file for complete search history.

(56) References Cited

U.S. PATENT DOCUMENTS

| 1,377,792 A | 5/1921 | Rice |
| 3,356,273 A | 12/1967 | Wallace |
| 3,693,858 A * | 9/1972 | Araya et al. ............... 219/137.7 |
| 3,999,697 A | 12/1976 | Hill, Jr. |
| 4,068,106 A | 1/1978 | Shaputis |
| 4,206,862 A | 6/1980 | DaCosta |
| 4,924,053 A | 5/1990 | Morgan et al. |
| 5,155,332 A | 10/1992 | Maguire |
| 5,584,426 A | 12/1996 | Ziesenis |
| 5,782,394 A | 7/1998 | Langley |
| 6,841,752 B2 * | 1/2005 | Ward ............................... 219/75 |
| 7,078,646 B2 | 7/2006 | Borne et al. |
| 8,026,456 B2 | 9/2011 | Achtner et al. |
| 2006/0070986 A1* | 4/2006 | Ihde et al. ................ 219/137.71 |
| 2006/0163230 A1* | 7/2006 | Kaufman ................. 219/137.71 |
| 2008/0116176 A1* | 5/2008 | Ulrich ............................. 219/74 |
| 2008/0257874 A1* | 10/2008 | Kaufman et al. ......... 219/137 R |

(Continued)

FOREIGN PATENT DOCUMENTS

| DE | 102005041695 | 3/2007 |
| EP | 2298484 | 3/2011 |

(Continued)

OTHER PUBLICATIONS

Machine translation of JP-09-141,435, Nov. 2014.*

(Continued)

*Primary Examiner* — Geoffrey S Evans
(74) *Attorney, Agent, or Firm* — Fletcher Yoder P.C.

(57) ABSTRACT

A handheld filler wire advancement device is provided. The device includes a casing having an opening extending axially through the casing for receiving a rod of filler wire, wherein the casing comprises a feed rate selection feature that enables selection of a desired filler wire feed rate and a pull back to feed forward ratio selection feature that enables selection of a pull back to feed forward ratio. The device also includes a drive assembly disposed within the casing and adapted to contact the rod of filler wire to advance and retract the rod of filler wire within the opening of the casing consistent with the desired filler wire feed rate and the pull back to feed forward ratio. Further, the device includes a motor disposed within the casing and coupled to the drive assembly to provide the drive assembly with power for movement of the rod of filler wire.

17 Claims, 4 Drawing Sheets

(56) References Cited

U.S. PATENT DOCUMENTS

| | | | |
|---|---|---|---|
| 2011/0204034 A1* | 8/2011 | Schartner et al. | 219/137.71 |
| 2011/0220629 A1* | 9/2011 | Mehn et al. | 219/136 |
| 2011/0284500 A1* | 11/2011 | Rappl et al. | 219/74 |
| 2011/0303647 A1 | 12/2011 | Achtner et al. | |
| 2012/0241430 A1* | 9/2012 | Luck et al. | 219/137.7 |

FOREIGN PATENT DOCUMENTS

| | | | |
|---|---|---|---|
| JP | 09-141435 A | * | 6/1997 |
| JP | 09141435 | | 6/1997 |
| JP | 11-033729 A | * | 2/1999 |
| WO | 2012066135 | | 5/2012 |
| WO | WO-2012/066135 A1 | * | 5/2012 |

OTHER PUBLICATIONS

Machine translation of JP-11-033,729, Nov. 2014.*
Machine translation of WO 2012/066,135, Nov. 2014.*
International Search Report from PCT application No. PCT/US2013/049478 dated Dec. 9, 2013, 11 pgs.

* cited by examiner

METHODS AND SYSTEMS FOR FEEDING FILLER MATERIAL TO A WELDING OPERATION

BACKGROUND

The invention relates generally to welding systems and, more particularly, to handheld wire advancement devices that feed filler wire to a welding operation.

Welding is a process that has become ubiquitous in various industries for a variety of types of applications. For example, welding is often performed in applications such as shipbuilding, repair work, construction, and so forth. To facilitate such welding processes, welding systems generally include an electrode configured to pass an arc between a torch and a work piece, thereby heating the work piece to create a weld. In many systems, such as metal inert gas (MIG) welding and stick welding systems, the electrode is a consumable wire that melts into the weld to provide a filler material into the weld. In contrast, other systems, such as tungsten inert gas (TIG) welding systems, employ a non-consumable tungsten electrode that is independent from the filler material. That is, the TIG welding process does not melt the tungsten electrode into the weld forming on the work piece, and, therefore, in TIG welding operations, a filler wire is typically advanced into the weld pool with a free hand of the welding operator.

Unfortunately, the filler wire is often difficult for the welding operator to manipulate with a single hand because the welding operator must expose additional filler material to the weld as the filler material is melted. Additionally, the TIG welding process often requires the operator to feed the filler wire forward and pull the filler wire backward throughout the process to obtain the desired quantity and placement of the filler material. Still further, the piece of filler wire that the welding operator must hold and manipulate may be, for example, approximately 36 inches in length, thus contributing to the difficulty of manipulating the wire with a single hand during the welding process. Accordingly, there exists a need for improved filler wire feeding methods and system that address these drawbacks.

BRIEF DESCRIPTION

In an embodiment, a handheld filler wire advancement device is provided. The device includes a casing having an opening extending axially through the casing for receiving a rod of filler wire. The device also includes a drive assembly disposed within the casing and adapted to contact the rod of filler wire to advance and retract the rod of filler wire within the opening of the casing. Further, the device includes a motor disposed within the casing and coupled to the drive assembly to provide the drive assembly with power for movement of the rod of filler wire. The device, however, does not convey welding current during operation.

In another embodiment, a method for automatically controlling movement of a rod of filler wire through a handheld wire advancement device is provided. The method includes receiving data corresponding to at least one parameter of a welding operation and determining, based on the received data, a filler wire feed rate for the welding operation. The method further includes controlling the handheld wire advancement device to automatically feed the rod of filler wire toward a weld pool at the determined filler wire feed rate without operator input. Here again, the device does not convey welding current during operation.

In another embodiment, a welding system includes a welding power source adapted to generate a welding power output for use in a welding operation and a weld controller disposed in the welding power source for controlling the operation of the welding power source. The system also includes a handheld filler wire advancement device including a casing having an opening extending axially therethrough for receiving a rod of filler wire and a motor drive assembly having a motor coupled to a drive assembly for powering and moving the rod of filler wire through the casing. The system further includes a wire advancement controller in communication with the weld controller and the motor drive assembly and adapted to control the powering and moving of the rod of filler wire through the casing. The system does not convey welding current during operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, provided herein are embodiments of handheld filler wire advancement devices for the feeding of a rod of filler wire toward a weld pool. The filler wire advancement devices may include a drive motor in or on the device that is capable of providing power local to the device for the feeding of the filler wire. Further, the wire advancement devices may also include a drive assembly capable of contacting the filler wire rod and utilizing the power provided by the motor to move the rod through the device and toward the weld pool. In certain embodiments, the wire advancement device may communicate with the welding power supply to coordinate an automatic feed of the rod of filler wire without operator input. That is, in some embodiments, the operator may simply hold the device in the desired position, and the rod of filler wire may be automatically advanced toward and retracted from the weld pool at the desired rate. However, unlike a welding torch, the device does not convey welding current during operation. The foregoing feature may offer advantages over systems in which the operator must manually feed the rod of filler wire into the weld pool. For example, by reducing or eliminating the need for the operator to manually manipulate the filler wire rod with a single hand, greater uniformity of the weld bead may be achieved.

Figure 1:
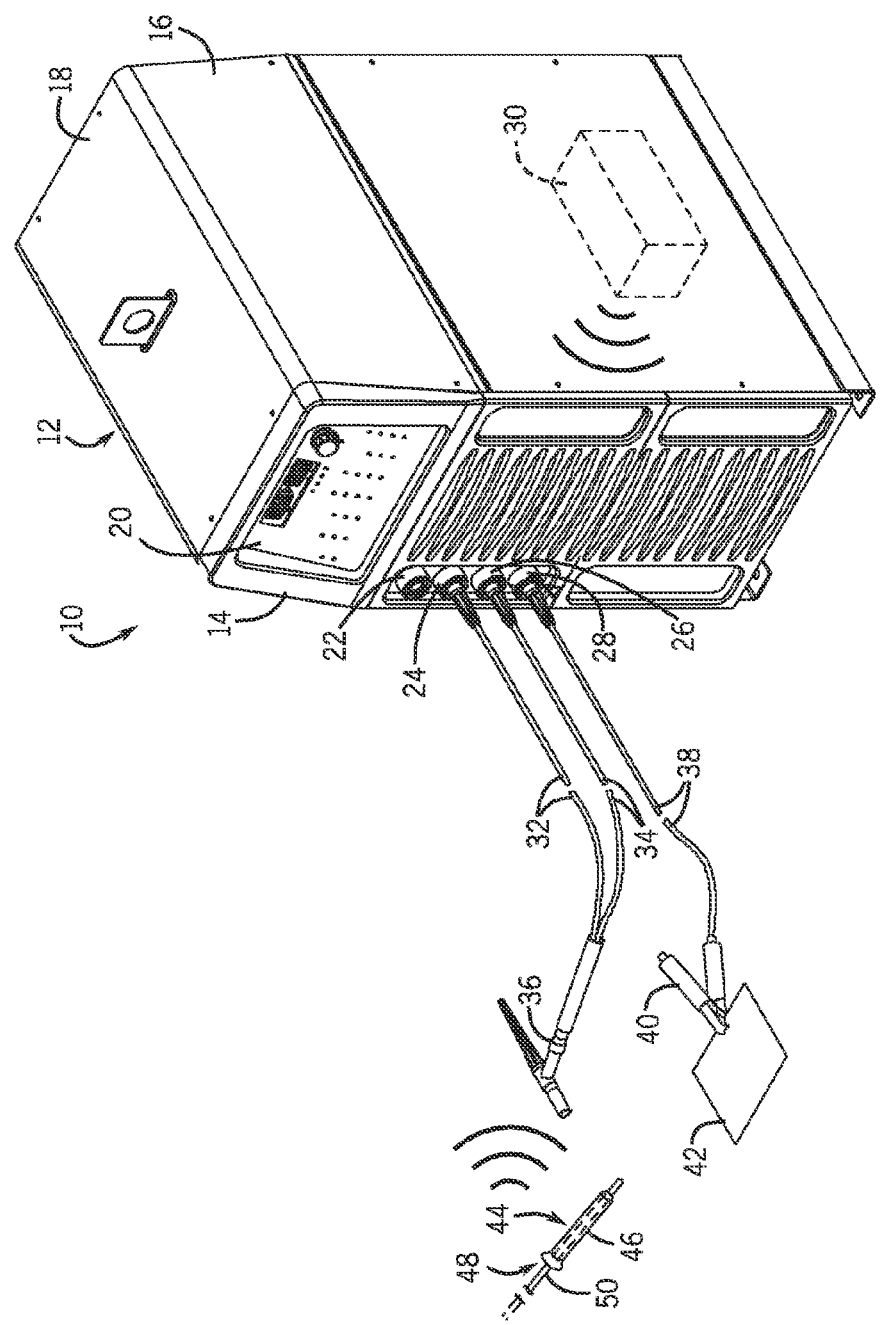
FIG. 1 is a perspective view of an embodiment of a welding system including a welding power source with an internal receiver and a handheld wire advancement device.

Turning now to the drawings, FIG. 1 is a perspective view of a welding system 10 including a welding power source 12 configured to provide a power output for a tungsten inert gas (TIG) welding operation (or a stick welding operation). However, it should be noted that in other embodiments, the welding power source may be configured to produce power for any desirable type of welding operation (e.g., metal inert gas (MIG) welding), particularly any welding operation in which a feed of filler wire toward the weld pool may be desirable. In certain embodiments, the power source 12 may supply a direct current (DC) or alternating current (AC) to a welding torch, depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., approximately 56 Hz) current may generate a wide arc with shallow penetration of a workpiece, while a high AC frequency (e.g., approximately 200 Hz) current may generate a focused arc with deeper penetration into a workpiece.

In the illustrated embodiment, the welding power source 12 includes a front panel 14, a side panel 16, a top panel 18, and a weld controller 30 disposed therein. The front panel 14 includes a control panel 20 through which an operator may control one or more parameters of the welding operation, for example, via coordination with the weld controller 30. The welding power source 12 further includes receptacles 22, 24, 26, and 28 that interface with one or more welding devices and/or accessories. For example, in the illustrated embodiment, the second and third receptacles 24 and 26 receive cables 32 and 34 that connect to a welding torch 36, and the fourth receptacle 28 receives cable 38 that terminates in work clamp 40.

The work clamp 40 connects to a workpiece 42 to close the circuit between the welding power source 12, the workpiece 42, and the welding torch 36 during operation. That is, in general, the welding system 10 may provide for current flow via the workpiece 42 to the power source 12. For example, in the configuration depicted in FIG. 1, the current provided by the power source 12 flows through the supply conduit to the torch 36, flows across an arc from an electrode to the workpiece 42, and returns to the power source 12 via the work clamp 40 and the cable 38.

During operation, in addition to the frequency of the current, the power source 12 may vary the amperage of the current output to the torch 36. The setting for the amperage output by the power source 12 may be adjusted by a setting a knob or button or other input device on the control panel 20 of the power source 12, or may be set by a remote control. For example, in certain embodiments, the welding system 10 may include a foot pedal remote control that enables the operator to make current adjustments during welding by either holding down the foot pedal or feathering the foot pedal remote control to vary the amperage. The remote control may also include a finger tip control, audible command, or other form of input to signal the power source 12 to output a corresponding current.

In addition, although not depicted in FIG. 1, the torch 36 may be supplied with a shielding gas from a gas source. In general, the shielding gas may be supplied to the torch 36 and expelled from the torch at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which may cause fusion defects, porosity, and weld metal embrittlement. The shielding gas may also transfer heat from the welding electrode to the metal and may help to start and maintain a stable arc.

The welding system 10 of FIG. 1 also includes a wire advancement device 44. The wire advancement device 44 includes a casing 46 and an axial passageway or opening 48 extending therethrough. The opening 48 receives a filler wire rod 50, which may be retained within the casing 46 by any suitable internal mechanism, such as a plurality of drive rolls that apply pressure to the rod, clamps, securement devices, and so forth. As described in more detail below, a motor drive assembly that includes a drive assembly and a motor may also be disposed in or on the casing 46 to facilitate the manually or automatically activated motorized feeding of the filler wire rod toward a weld pool on the workpiece 42 during a welding operation.

During welding, an operator may hold the welding torch 36 in one hand and the wire advancement device 44 in the other hand. The illustrated TIG welding torch 36 employs a non-consumable tungsten electrode that is independent from the filler wire rod 50. As such, as the operator performs the welding process, the tungsten electrode does not melt into the weld forming on the workpiece 42. Instead, as the operator utilizes the welding torch 36 to form the weld with one hand, the operator holds the wire advancement device 46 in the other hand in order to advance filler wire into the weld pool.

In one embodiment, a semi-automated filler material feed process may occur in which the operator utilizes, for example, a button provided on the casing 46 of the wire advancement device 44 to activate the motor drive assembly to feed the filler wire rod 50 into the weld pool. In this embodiment, the operator retains control over the feed rate and the pull back to feed forward ratio, but the motor drive assembly physically moves the rod 50 toward the weld pool as dictated by the operator. In another embodiment, however, the filler rod feeding process may be entirely automated, and the operator may simply hold the wire advancement device 44 in one hand while the feeding of the filler material occurs under the control of a controller. The semi-automation or automation of the feeding of the filler material enabled by the foregoing embodiments disclosed herein may offer advantages over traditional systems in which the operator must utilize his or her free hand to manipulate the filler wire rod 50 into the weld pool.

Figure 2:
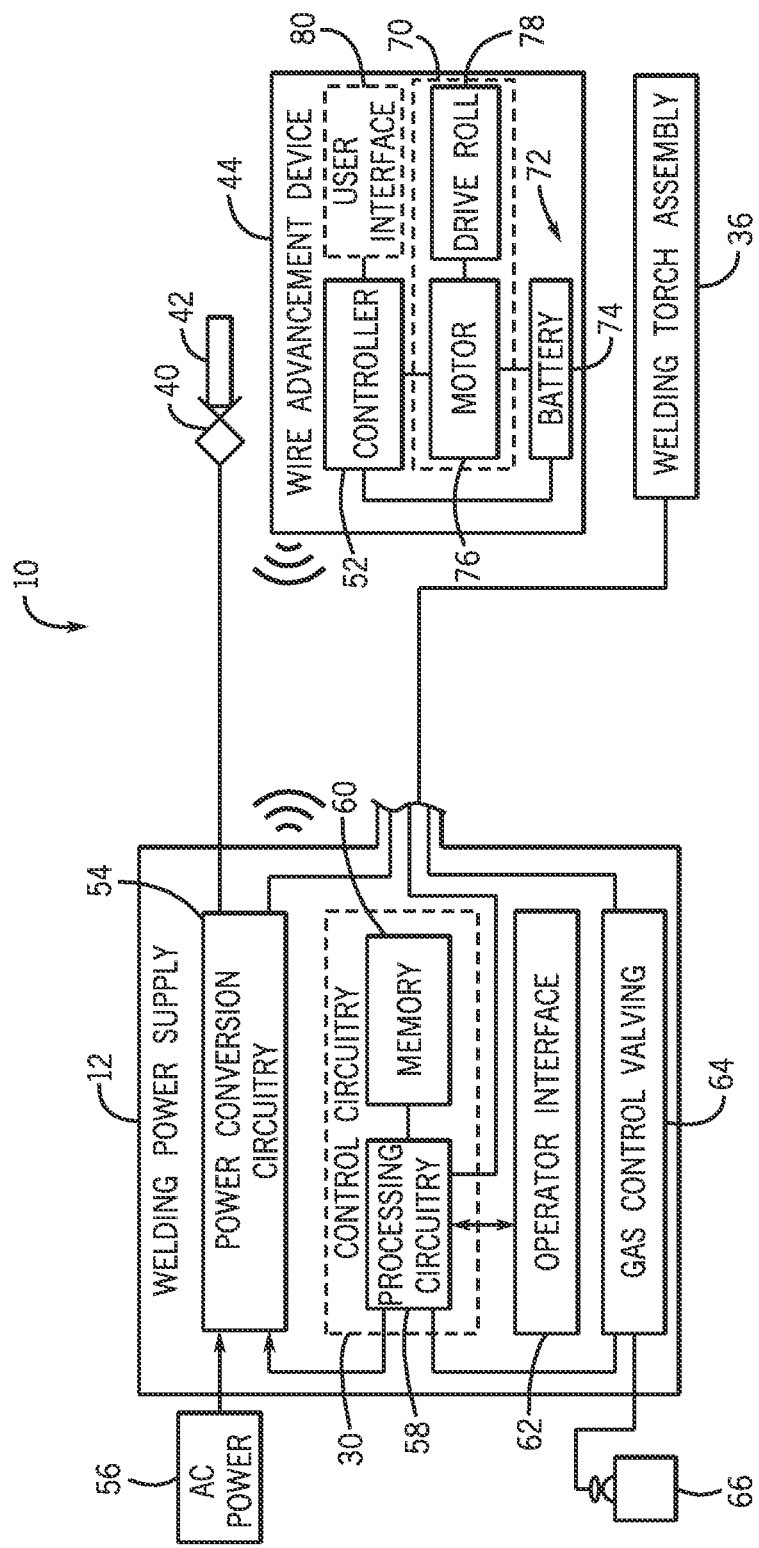
FIG. 2 is a block diagram illustrating example internal components of a wireless embodiment of the welding power supply and the handheld wire advancement device of FIG. 1.

FIG. 2 is a block diagram illustrating one embodiment of the welding system 10 provided in FIG. 1 in which a controller 52 located in the wire advancement device 44 wirelessly communicates with the weld controller 30 to coordinate the automatic or semi-automatic feeding of the filler material 50 into the weld pool. Examples of suitable internal components included in the welding power supply 12 and the wire advancement device 44 that are consistent with one presently disclosed embodiment are shown. However, it should be noted that the particular components included in the welding power supply 12 and the wire advancement device 44 of the illustrated welding system 10 are subject to a variety of implementation-specific variations that are within the scope of presently disclosed embodiments. That is, more or fewer components may be included in other embodiments, depending on features of the given application.

In the illustrated embodiment, the welding power supply 12 includes power conversion circuitry 54 that receives input power from an alternating current power source 56 (e.g., the AC power grid, an engine/generator set, a battery, or a combination thereof). The power applied to the power conversion circuitry 54 may originate in a power grid, although other sources of power may also be used, such as power generated by an engine-driven generator, batteries, fuel cells or other alternative sources. After receiving the input power, the power conversion circuitry 54 conditions the input power, and provides output power to power one or more welding devices (e.g., welding torch assembly 36) in accordance with demands of the system 10. Accordingly, in some embodiments, the power conversion circuitry 54 may include circuit elements, such as transformers, rectifiers, switches, and so forth, capable of converting the AC input power to a direct current electrode positive (DCEP) or direct current electrode negative (DCEN) output, as dictated by the demands of the system 10.

The welding power supply 12 also includes the control circuitry 30 that is configured to receive and process a plurality of inputs regarding the performance and demands of the system 10. The control circuitry 30 includes processing circuitry 58 and memory 60. The memory 60 may include volatile or non-volatile memory, such as read only memory (ROM), random access memory (RAM), magnetic storage memory, optical storage memory, or a combination thereof. Furthermore, a variety of control parameters may be stored in the memory 60 along with code configured to provide a specific output (e.g., initiate wire feed, enable gas flow, etc.) during operation. The processing circuitry 58 may also receive one or more inputs from an operator interface 62 disposed, for example, on control panel 20, through which the user may choose a process and input desired parameters (e.g., voltages, currents, particular pulsed or non-pulsed welding regimes, and so forth). The processing circuitry 58 is also coupled to gas control valving 64, which regulates the flow of shielding gas from a gas cylinder 66 to the torch 36. In general, such gas is provided at the time of welding, and may be turned on immediately preceding the weld and for a short time following the weld.

Based on such inputs received from the operator, the control circuitry 30 operates to control generation of welding power output for carrying out the desired welding operation, for example, via control signals transmitted to the power conversion circuitry 54. Based on such control commands, the power conversion circuitry 54 is configured to create the output power that will ultimately be applied to the welding electrode at the torch 36. To this end, as noted above, various power conversion circuits may be employed, including choppers, boost circuitry, buck circuitry, inverters, converters, and so forth.

As illustrated, the welding system 10 also includes the wire advancement device 44. In this embodiment, the wire advancement device 44 includes the controller 52, a motor drive assembly 70, and an energy storage system 72 including a battery 74 (or any other suitable energy storage device). The illustrated wire drive assembly 70 includes a motor 76 and a drive roll system 78. Further, the wire advancement device 44 may or may not include the illustrated user interface 80.

During operation, the controller 52 in the wire advancement device 44 wirelessly communicates with the control circuitry 30 in the welding power supply 12 to coordinate feeding of the filler wire. More specifically, the controller 52 controls one or more operational parameters of the motor drive assembly 70 to pull the filler wire rod through the wire advancement device 44. For example, the controller 52 controls the power output of the motor 76 and the movement of the drive rolls 78. It should be noted, however, that as mentioned above, the wire advancement device 44, unlike the welding torch 36, does not convey welding current (or more generally, welding power) during operation.

In the illustrated embodiment, the wire advancement device 44 is not coupled to the welding power supply 12 via a wired connection. Therefore, the wire advancement device 44 includes an energy storage system 72 that powers operation of the device 44. In the illustrated embodiment, the battery 74 in the device 44 produces power for operation of the device 44. In other embodiments, the battery 74 may be replaced by any suitable device capable of storing and discharging energy, such as any of a variety of known energy storage devices. In some embodiments, the battery 74 may be removable from the wire advancement device 44 to facilitate replacement or recharging of the battery 74. However, in other embodiments, the battery 74 may be irremovable and configured for charging while remaining integrated with the wire advancement device 44.

Figure 3:
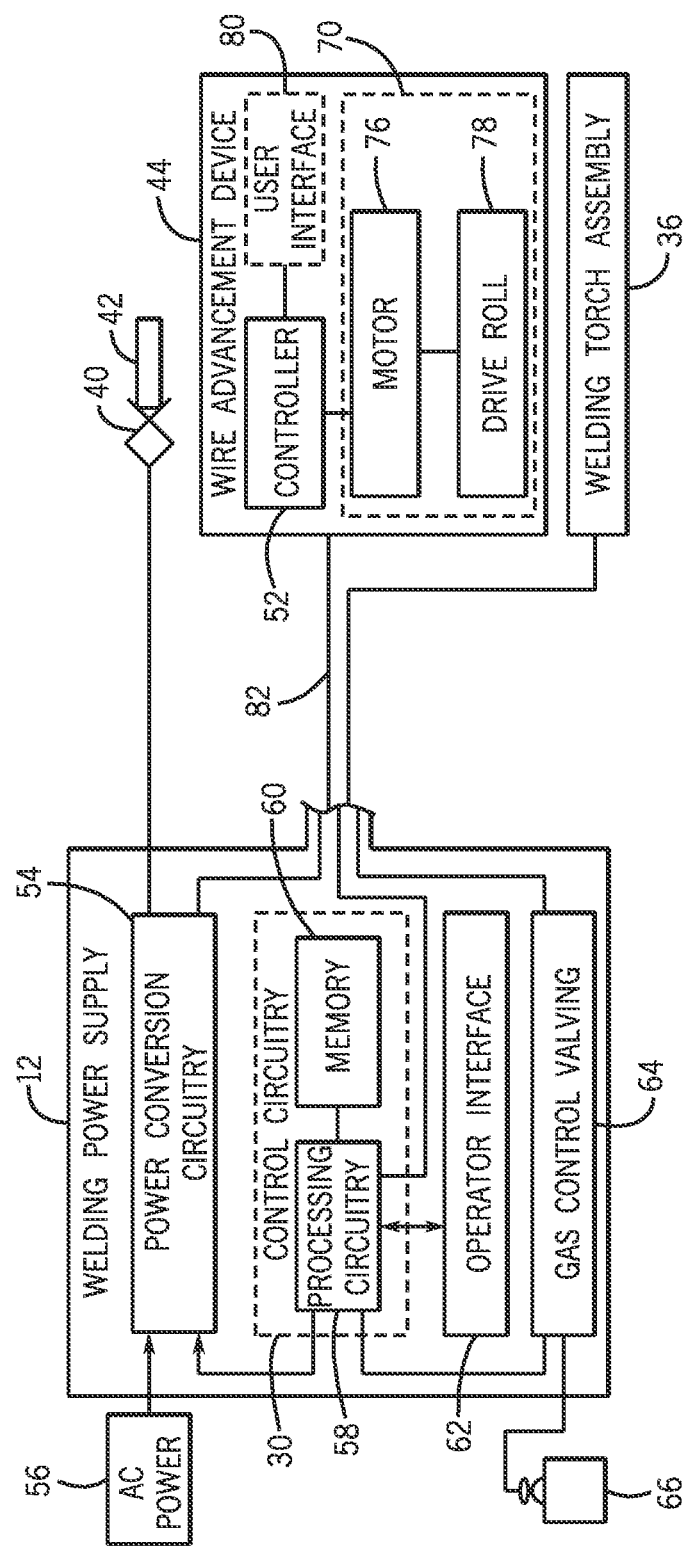
FIG. 3 is a block diagram illustrating example internal components of a wired embodiment of the welding power supply and the handheld wire advancement device of FIG. 1.

FIG. 3 illustrates an alternate embodiment of the welding system 10 of FIG. 2 in which the wire advancement device 44 is coupled to the welding power supply 12 via a wired connection, i.e., cable 82, which may, for example, be coupled to the 14-pin connection present at receptacle 22 of the welding power supply 12. The cable 82 may be capable of bidirectional transmission of both data (e.g., between controller 52 and control circuitry 30) as well as power. In this embodiment, the wire advancement device 44 may not include the energy storage system 72 and may instead be powered by power generated by the welding power supply 12. It should be noted, however, that in some embodiments, the wire advancement device 44 may include both an energy storage system and a wired connection to the welding power supply 12.

Figure 4:
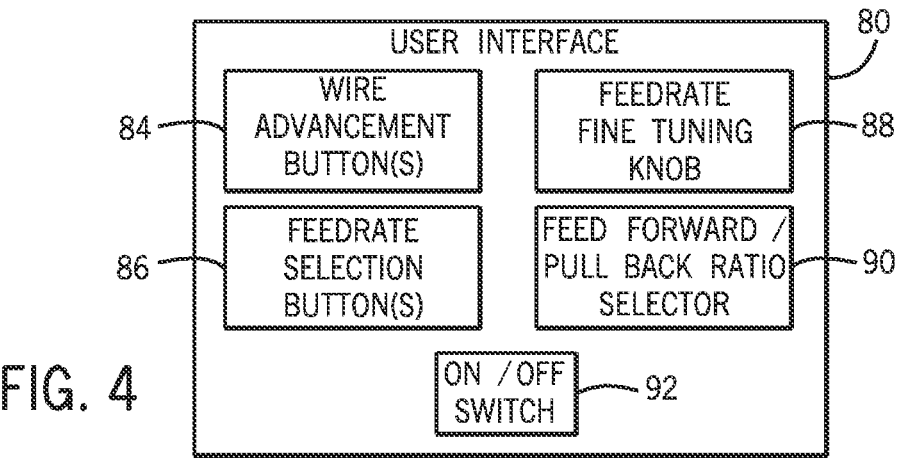
FIG. 4 is a schematic illustrating an example of a user interface that may be disposed on an embodiment of the handheld wire advancement device of FIG. 1.

FIG. 4 is a schematic illustrating examples of components that may be located on certain embodiments of the user interface 80 that may be provided on the wire advancement device 44 in some embodiments. As shown, the example user interface 80 includes one or more wire advancement buttons 84. The wire advancement buttons 84 may include, for example, a feed forward button that advances the wire forward at a preset feed rate when depressed. The user interface 80 may also include one or more feed rate selection buttons 86, which may be utilized, for example, with a feed rate fine tuning knob 88 to set a desired feed rate for the filler material. The user interface 80 further includes a feed forward to pullback ratio selector 90 that enables the operator to designate how much pullback is associated with each feed forward of the filler rod during the welding operation. Finally, the example user interface 80 includes an ON/OFF switch 92 that may be utilized by the operator to power up or down the device 44.

Figure 5:
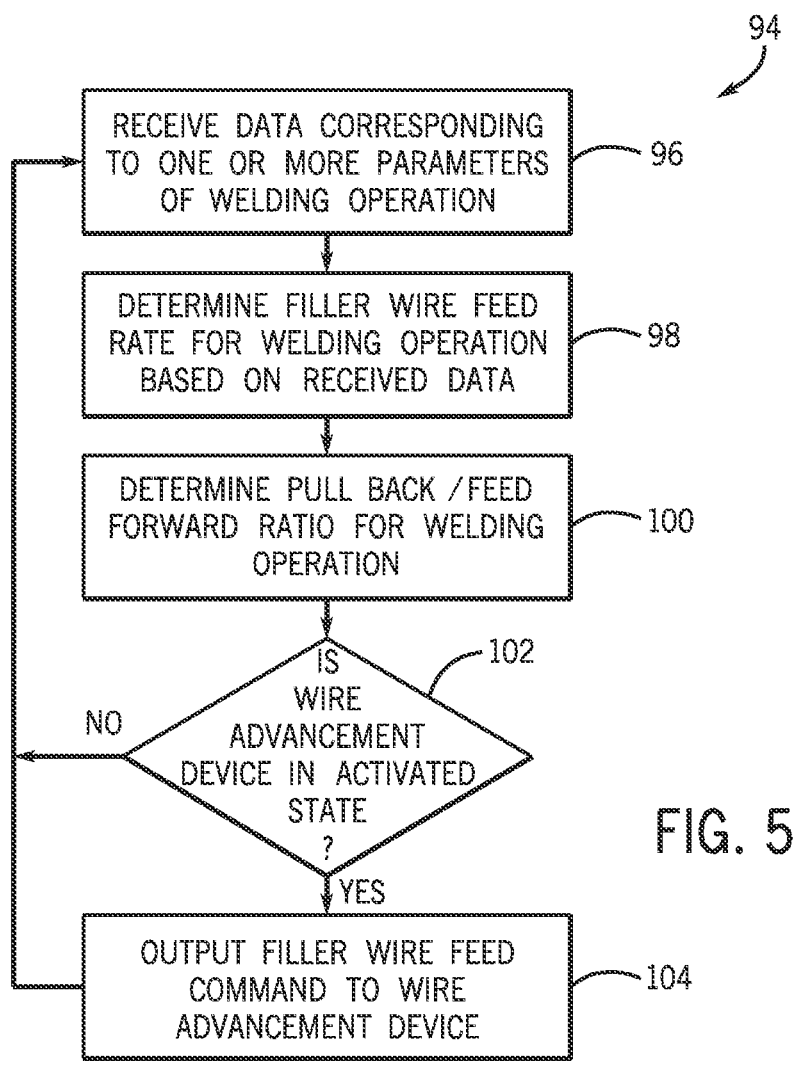
FIG. 5 is a flow diagram illustrating a method that may be implemented by a controller to automatically control the advancement of filler wire through the handheld wire advancement device of FIG. 1.

FIG. 5 is a flow diagram illustrating a method 94 that may be employed by a suitable controller, such as controller 52, to automatically control the feeding of filler material to the weld pool during a welding operation. As shown, the method 94 includes the step of receiving data corresponding to one or more parameters of the weld operation (block 96). For example, the wire advancement controller 52 may receive information from the weld controller 30 regarding the current or voltage setting for the given welding operation. Once received, the controller utilizes the data to determine an appropriate feed rate of the filler material (block 98) and a suitable feed forward to pullback ratio (block 100) for the welding operation.

The controller then checks if the wire advancement device is in an activated state for use in the welding operation (block 102). If not, the wire advancement device controller maintains communication with the weld controller to receive any updates that may occur, for example, based on any changes the weld operator makes to the welding process via the user interface before beginning to weld. However, if the wire advancement device is positioned and activated for use (i.e., a welding operation has been initiated) the filler material is fed to the weld pool under the command of the controller (block 104). In this way, certain embodiments of the wire advancement device may provide for automatic feeding of filler material to the weld pool, thus reducing or eliminating the need for the weld operator to manually or non-automatically provide such a feed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A handheld filler wire advancement device, comprising:
a casing having an opening extending axially through the casing for receiving a rod of filler wire, wherein the casing comprises a feed rate selection feature that enables selection of a desired filler wire feed rate and a pull back to feed forward ratio selection feature that enables selection of a pull back to feed forward ratio;
a drive assembly disposed within the casing and configured to contact the rod of filler wire to advance and retract the rod of filler wire within the opening of the casing consistent with the selected desired filler wire feed rate and the selected pull back to feed forward ratio; and
a motor disposed within the casing and coupled to the drive assembly to provide the drive assembly with power for movement of the rod of filler wire; and
wherein the handheld filler wire advancement device does not convey welding current during operation.

2. The device of claim 1, wherein the casing comprises a wire advancement button configured to activate the motor to produce the power when the wire advancement button is depressed.

3. The device of claim 1, wherein the casing further comprises a feed rate fine tuning knob that enables fine tuning of the desired filler wire feed rate.

4. The device of claim 1, comprising a first controller disposed within the casing and configured to control operation of the motor and the drive assembly.

5. The device of claim 4, wherein the first controller is configured to receive data corresponding to a welding operation parameter and to utilize the received data to automatically control operation of the drive assembly and the motor to automatically advance and retract the filler wire through the opening in the case without operator input.

6. The device of claim 5, wherein the first controller is configured to wirelessly receive the data from a second controller located in a tungsten inert gas (TIG) welding power supply.

7. The device of claim 5, wherein the first controller is configured to receive the data from a second controller located in a tungsten inert gas (TIG) welding power supply via a wired connection to a 14-pin connection disposed on the TIG welding power supply.

8. A method for automatically controlling movement of a rod of filler wire through a handheld wire advancement device, comprising:
receiving data corresponding to at least one parameter of a welding operation;
determining, based on the received data, a filler wire feed rate for the welding operation;
determining, based on the received data, a pull back to feed forward ratio for the welding operation;
controlling the handheld wire advancement device to automatically feed the rod of filler wire toward a weld pool at the determined filler wire feed rate without operator input, or to automatically implement the pull back to feed forward ratio without operator input; and
wherein the handheld wire advancement device does not convey welding current during operation.

9. The method of claim 8, wherein the handheld wire advancement device comprises at least one drive roll coupled to a motor and configured to contact the rod of filler wire to feed the rod of filler wire toward the weld pool.

10. The method of claim 8, wherein the at least one parameter comprises an amperage of the welding operation.

11. The method of claim 8, wherein receiving data corresponding to at least one parameter of a welding operation comprises wirelessly communicating with a controller located in a welding power supply.

12. The method of claim 8, wherein receiving data corresponding to at least one parameter of a welding operation comprises communicating with a controller located in a welding power supply via a wired connection to a 14-pin connection located on a casing of the welding power supply.

13. A welding system, comprising:
a welding power source configured to generate a welding power output for use in a welding operation;
a welding torch coupled to the welding power source and receiving welding current from the welding power source during operation for establishing and maintaining a welding arc;
a weld controller disposed in the welding power source for controlling the operation of the welding power source;
a handheld filler wire advancement device separate from the welding torch and comprising a casing having an opening extending axially therethrough for receiving a rod of filler wire and a motor drive assembly having a motor coupled to a drive assembly for powering and moving the rod of filler wire through the casing, the handheld filler wire advancement device not conveying welding current during operation; and
a wire advancement controller in communication with the weld controller and the motor drive assembly and configured to control the powering and moving of the rod of filler wire through the casing consistent with a desired filler wire feed rate and a pull back to feed forward ratio.

14. The welding system of claim 13, wherein the wire advancement controller is configured to wirelessly communicate with the weld controller.

15. The welding system of claim 13, wherein the welding power source comprises a tungsten inert gas (TIG) welding power source.

16. The welding system of claim 13, comprising a welding torch coupled to the welding power source and configured to receive the welding power output from the welding power source.

17. The welding system of claim 13, wherein the wire advancement controller is configured to receive data corresponding to one or more parameters of the welding operation from the weld controller and to automatically control operation of the motor drive assembly based on the received data without operator input.

* * * * *